Dec. 19, 1967      A. D. SIEGEL      3,358,826
DENTAL TOOLS FOR ROOT CANAL THERAPY KIT
Filed Sept. 7, 1965
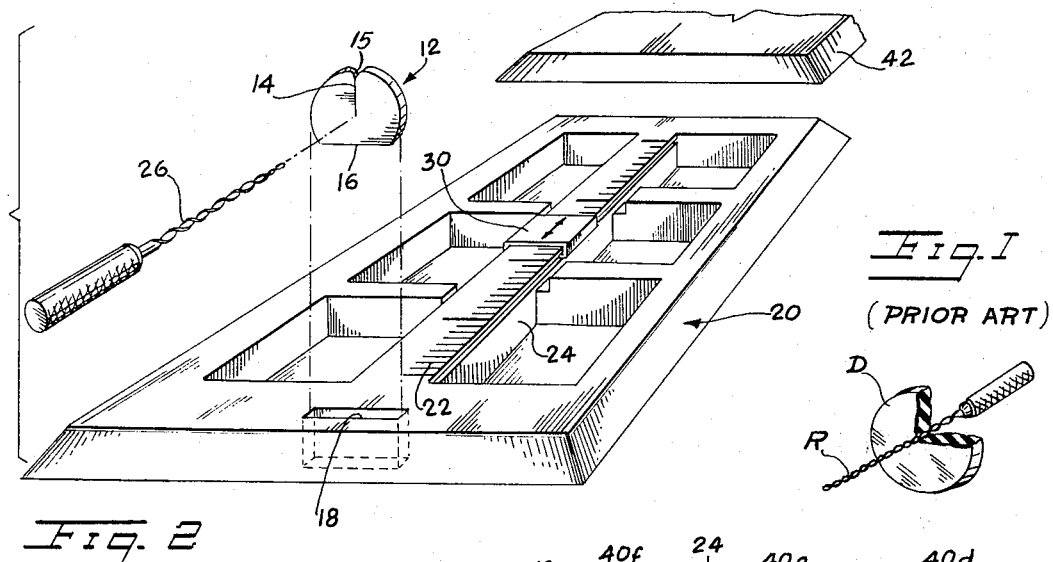
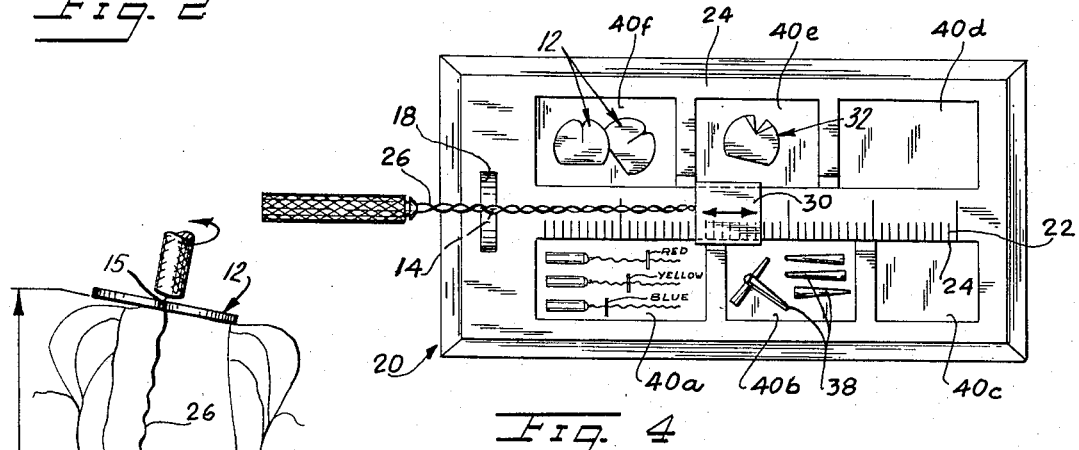
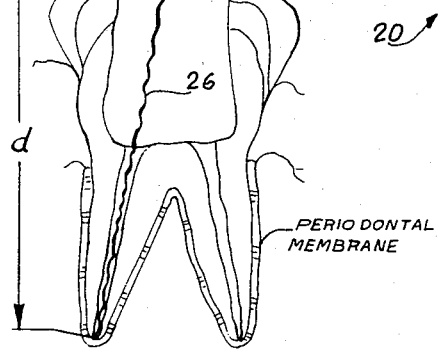
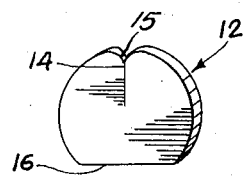
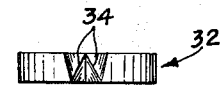
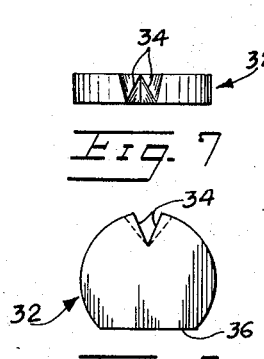
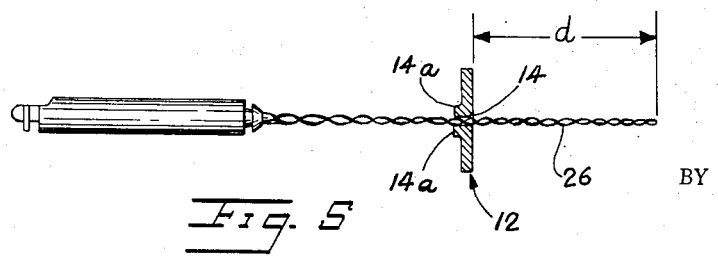
INVENTOR.
ALLAN D. SIEGAL
BY Leonard H. King
ATTORNEY United States Patent Office 3,358,826
Patented Dec. 19, 1967

3,358,826
DENTAL TOOLS FOR ROOT CANAL
THERAPY KIT
Allan D. Siegel, 748 Colonade Road,
West Hempstead, N.Y. 11552
Filed Sept. 7, 1965, Ser. No. 485,442
14 Claims. (Cl. 206—63.5)

ABSTRACT OF THE DISCLOSURE

Dental tools particularly suited for root canal surgery including a removable stop for root canal reamers and a tool tray with measuring means.

---

This invention relates to dental tools and more particularly to instruments for root canal therapy.

The objective of root canal therapy is to clean out the nerve canals in the tooth, sterilize them and fill them with an inert sealer. It is important that throughout the complete operation instrumentation must not penetrate beyond the end of the root and irritate the periodontal tissues. On the other hand, it is essential that the complete canal, right to the root tip, be cleaned and filled to eliminate all the organic matter that might be a source of future infection.

The usual procedure in root canal work is to open the tooth into the pulp chamber and then to work down to the root end. The length of the root is ascertained by means of X-rays. After the length of the canal is determined, the walls are cleaned by using larger and larger reamers until the predetermined length of the canal is reached. If a reamer having a length equal to the canal length is employed, it will assure that the root tip is attained. To prevent the extension of the tool beyond the root tip, the present invention provides a simple to use, inexpensive stop member.

After the canal is completely debrided and sterilized, a root canal plug of a fairly rigid material, usually silver or gutta percha, in combination with a paste sealer, is placed just to the end of the canal to complete the treatment.

In order to limit the depth of penetration, current practice in the endodontic art is to push the reamer through a stiff rubber disc and use the disc as the stop. This creates a problem in that there is a tendency for the very fine reamers employed to break or bend when forced through the rubber disc. Further, the rubber is difficult to sterilize, and if presterilized may not be stored together with other tools in a sterilized condition. Still other conventional devices are difficult to use requiring the use of wrenches and handling inconsistent with maintaining of sterility.

The present invention provides simple yet effective means for accurately limiting the depth of the reaming operations and filling. In a small, compact and convenient package or kit, a depth gauge is provided for reamers and canal plugs, points and like members. Stop members, to which the reamers may be readily attached, are included, as is a cutting tool for precisely severing the root canal plugs at the exact length required. Compartments formed in the kit provide convenient storage means for assembled root canal tools and stop members, individual root canal tools of different sizes, a supply of stop members and the cutting tool.

Accordingly, an object of the invention is to provide an improved, readily attachable and removable stop means for root canal tools to prevent them from going beyond the desired depth.

Still a further object of the invention is to provide a kit which will simplify and facilitate the attachment of a stop member at the desired location on a dental tool.

Another object of the invention is to provide an improved, readily attachable stop member for root canal reamers.

A still further object of this invention is to provide an improved tool, in combination with the aforementioned kit, for cutting dental points or plugs to the proper length.

Another object is to provide means in the aforementioned kit that will accurately locate either the stop member or cutting tool with respect to a calibrated scale.

These and other features, objects and advantages of the invention will, in part, become obvious from the following more detailed description of the invention, taken in conjunction with the accompanying drawing, which forms an integral part thereof.

In the various figures of the drawing like reference characters designate like parts.

In the drawing:

FIG. 1 is a perspective showing of the prior art device.

FIG. 2 is a perspective showing of the tool tray with a stop member and a typical reamer shown in exploded relation to the tray.

FIG. 3 is an enlarged elevational view of a typical tooth with a reamer inserted, and the stop member in position.

FIG. 4 is a plan view showing how the kit depth gauge is utilized for insertion of a reamer in a stop member.

FIG. 5 is a sectional side elevational view of an assembled reamer and stop member.

FIG. 6 is a pictorial view of a typical stop member.

FIG. 7 is a plan view of a plug cutting tool.

FIG. 8 is a front view of the plug cutting tool, shown in FIG. 7.

In root canal work a dentist first removes the tooth pulp and then employs extremely fine reamers to remove material in the root canal. It is necessary to limit the penetration of the reamer to the depth that is absolutely necessary in order to prevent perforation of the periodontal membrane. Accordingly, a stop member is placed on the reamer. The prior art stop member is shown in FIG. 1 and consists simply of a rubber disc D into which the reamer R has been forced. These prior art devices have limitations in that they are difficult to accurately assemble, they are difficult to sterilize and difficult to maintain in a sterilized condition if not used immediately. There is also some reluctance on the part of dentists to store rubber articles with the fine reamers.

In carrying out the present invention, disc-like stop members of soft aluminum, brass, chrome-plate steel or material deformable under hand pressure, are clamped to the reamer. The stop member must be capable of seizing and securely holding the reamer in use. The selected material must be capable of undergoing sterilization. Typically, the disc, when made of metal, has an approximate dimension of ⅜ inch diameter and is between 0.020–0.040 inch thick. If a material such as semi-rigid silicone rubber is employed, then the thickness should be in the order of 0.2 inch. As shown in FIG. 6, the members 12 are provided with a slit 14, terminating in an enlarged opening 15 at the periphery thereof, and preferably with a chordal bottom portion 16. Slit 14 is formed by a shearing operation as opposed to the removal of material. Thus, when the reamer is inserted there will be a slight deformation, as shown somewhat exaggerated at 14a, in FIG. 5, whereby the reamer is firmly grasped by the sides of the slit.

Prior to assembly, the disc is dropped into recess 18 of tray 20 and, since the bottom of the recess is flat, the chordal portion 16 seats thereon and automatically aligns the disc so that the slit 14 is facing upwardly. The periphery of the disc 12 acts against the end walls of the recess 18 to align the slit 14 with a calibrated scale 22 on center rib 24 of the tray. The dentist can now insert the reamer 26 by simply pressing it downwardly while maintaining the tip 28 of the reamer aligned with the desired depth reading shown on scale 22. While a pivotal lever arm may be employed, dentists prefer to insert the reamer by hand so as to maintain better control, speed the operation and avoid chance of contamination. Preferably, a slide 30 is frictionally disposed on rib 24 to abut the end of the reamer at the desired marker and thereby assure accurate location of the stop member. A typical dimension $d$ representing the active or working length of the reamer is shown in FIGS. 3 and 5. Since the disc 12 is made of a deformable material and the reamer is made of a hardened steel, the disc is locked on and secured against unintentional disengagement when the reamer is inserted in the tooth, as shown in FIG. 3.

While aluminum is currently a preferred material, it is intended that other deformable materials be employed in the practice of this invention if they meet the necessary criteria of being heat sterilizable without depreciation of their properties and provided the materials have sufficient rigidity to firmly adhere to the reamer during use. For example, a successful test was made using a nylon disc having the thickness of 0.030 inch. It is to be understood that other thicknesses may be employed consistent with the holding power of the given material.

It is a common practice, when opening the root canal, to employ several different size reamers. The opening in the tooth is made in successive steps and to different depths by hand rotating the reamers. While the more skillful practitioner may be able to perform the entire operation with a single size reamer, it is more common to start with the smaller size reamer first and work to a particular depth. Succeedingly larger diameter reamers are then used to clean the walls and enlarge the canal.

It is an advantageous feature of this invention to color code the stop members. If the stop member is made of aluminum, it may be anodized in different colors. The required supply of different reamers which is schematically shown in FIG. 4 may then be prepared in advance for each patient. Advantages of color coding in multi-rooted teeth is that the likelihood of the instruments being used in the wrong canal is minimized. The color coding also permits saving of the sets for use on a given patient at successive treatment periods.

The kit may also be used for cutting the silver plugs and the like used by the root canal operator. Such a cutter 32 is shown in FIGS. 7 and 8 and has substantially the same form as the disc, but is made of a hardened steel provided with a sharp cutting edge 34 and a chordal length 36. The cutter 32 is placed into recess 18 and the silver plug 38 is led into the cutting edges after the location of the end of the plug has been determined by the scale 22. The dentist merely forces the plug down on to the cutting tool to cut the plug to the proper length.

It will be noted that tray 24 is provided with a multiplicity of compartments 40a, 40b, 40c, etc., for receiving a supply of reamers, discs, cutters and plugs. It is currently preferred that the tray be made of stainless steel or Delrin plastic, so that it may be sterilized together with the supplies. Other materials suitable for this purpose will occur to those skilled in the art. For example, nickel-plated and chrome-plated brass and copper have long been used for articles which are to be sterilized. Suitable plated steel may likewise be employed. A cover 42 may be placed over the tray, to protect the contents against contamination.

By the term "root canal tool" employed in the appended claims it is intended to encompass reamers, broaches, files, spirals and other instruments used to penetrate, enlarge, clean or fill the root canal of a tooth.

Having thus disclosed the best embodiment of the invention presently contemplated, it is to be understood that various changes and modifications may be made by those skilled in the art without departing from the spirit of the invention.

What is claimed is:

1. A kit for use in root canal therapy, said kit comprising:
   (a) a sterilizable tray;
   (b) a plurality of stop members in said tray each said stop member having means for affixing said stop member to a reamer tool;
   (c) holding means carried by said tray for temporarily holding a said stop member, while said stop member is being attached to a reamer tool; and
   (d) measuring means carried by said tray in cooperative relationship with the said stop member held by said holding means.
2. The kit of claim 1 wherein:
   (a) each said stop member has at least one edge defining an orienting plane and a slit perpendicular to said orienting plane, the slit extending inwardly from the edge opposite said orienting plane towards the center of said stop member; and
   (b) said tray has an open, upwardly facing recess having a flat bottom, the width and length of the recess being sized to receive said stop members, the recess being so disposed that a reamer tool extending transversely thereto is arranged for measurement by said measuring means.
3. The device in accordance with claim 2 wherein each said stop member is provided with a notched portion extending from the outer edge and tapering down to the slit.
4. The device in accordance with claim 2 wherein the slit extends to the center of said stop member.
5. The device in accordance with claim 2 wherein said stop member is substantially circular and wherein said orienting plane is defined by a chordally positioned edge.
6. The device in accordance with claim 2 wherein said stop member is non-resiliently deformable at least proximate the slit whereby when the stop member is deformed by pressing of a tool into the slit, the walls thereof will seize the tool.
7. The device in accordance with claim 2 wherein substantially the full length of the opposed edges of the slit are in abutment with each other when said stop member is not in use and wherein the edges of the slit are displaced to grip the tool in the assembled conditions.
8. The device in accordance with claim 1 wherein said stop member is color coded.
9. The kit in accordance with claim 1 wherein there is further included in said tray a cutting tool adapted to be received in said holding means of said tray, said cutting tool comprising a rigid, hardened member having at least one edge defining an orienting plane and a notch extending inwardly from the edge opposite said orienting plane, said locating edge being seatable in said holding means of said tray, the walls of said notch defining a cutting edge adapted to sever a portion of the plug from the remainder of the plug.
10. The kit in accordance with claim 1 wherein there is further included in said tray a cutting tool adapted to be mounted on said tray, said cutting tool comprising a rigid, hardened member having a pair of intersecting tapered cutting edges forming a notch adapted to cut a plug forced therein and means to orient the notch with the open end thereof facing upwardly.
11. The kit in accordance with claim 1 wherein there is further included in said tray a plug and a cutting tool adapted to be mounted on said tray, said cutting tool being adapted to sever a portion of the plug from the remainder of the plug.
12. The kit in accordance with claim 1 wherein said tray is comprised of a base member having a plurality of upstanding side walls, a rib member extending between two of said side walls, said measuring means being disposed on said rib member, said holding means being a recess disposed in one of said walls at one end of said rib member.
13. The apparatus in accordance with claim 12 wherein said tray further includes a plurality of dividers extending between said walls and said rib member to define a plurality of compartments in said tray.

14. An improved stop member adapted for releasable attachment to a root canal tool, said stop member comprising a member having at least one edge defining an orienting plane and a slit perpendicular to said edge, the slit extending inwardly from the edge of said member opposite said orienting plane, said stop member being nonresiliently deformable at least proximate the slit whereby when said stop member is deformed by pressing of the tool into the slit, the walls thereof will seize the tool.

References Cited

UNITED STATES PATENTS

| | | | |
|---|---|---|---|
| 889,458 | 6/1908 | Good | 30—296 |
| 2,907,586 | 10/1959 | Paxton et al. | |
| 3,056,408 | 10/1962 | Brown | 24—130 X |
| 3,191,909 | 6/1965 | Reischl | 30—168 X |
| 3,295,208 | 1/1967 | Redtenbacher | 32—40 |

FOREIGN PATENTS 571,439  3/1959  Great Britain.

MARTHA L. RICE, *Primary Examiner.*